United States Patent
Maldy

[19]

[11] Patent Number: 5,956,406
[45] Date of Patent: Sep. 21, 1999

[54] METHOD OF SETTING UP SECURE COMMUNICATIONS AND ASSOCIATED ENCRYPTION/DECRYPTION SYSTEM

[75] Inventor: Jacques Maldy, Saint Cheron, France

[73] Assignee: Alcatel Alstrom Compagnie Generale D'Electricite, Paris Cedex, France

[21] Appl. No.: 08/821,072

[22] Filed: Mar. 20, 1997

[30] Foreign Application Priority Data

Mar. 21, 1996 [FR] France .................................. 96 04093

[51] Int. Cl.⁶ ........................................................ H04L 9/30
[52] U.S. Cl. ................................................. 380/30; 380/21
[58] Field of Search ........................................ 380/30, 21

[56] References Cited

U.S. PATENT DOCUMENTS

| | | | |
|---|---|---|---|
| 4,736,423 | 4/1988 | Matyas | 380/30 |
| 4,771,461 | 9/1988 | Matyas | 380/30 |
| 5,864,667 | 1/1999 | Barkan | 380/30 |

FOREIGN PATENT DOCUMENTS

0436799A2  7/1991  European Pat. Off. .

*Primary Examiner*—Salvatore Cangialosi
*Attorney, Agent, or Firm*—Sughrue, Mion, Zinn, Macpeak & Seas, PLLC

[57] ABSTRACT

A method of establishing secure communication between users by means of a public key encryption/decryption system comprises the following steps: a center generates a pair of keys comprising a secret key and a public key, the center's public key is supplied to a user, this user generates a pair of keys specific to this user comprising a secret key and a public key but the public key of this user is encrypted with the center's public key, this user transmits to the center their own public key encrypted with the public key of the center, and the center decrypts the public key of this user and if this user is approved by the center, the center retransmits to this user the public key of this user encrypted with itself. This method provides centralized control of users' public keys.

8 Claims, 2 Drawing Sheets

METHOD OF SETTING UP SECURE COMMUNICATIONS AND ASSOCIATED ENCRYPTION/DECRYPTION SYSTEM

BACKGROUND OF THE INVENTION

1. Field of the invention

The invention concerns secure communications and more particularly communications using a public key encryption/decryption system.

2. Description of the prior art

With the growth of personal computers, the use of electronic (i.e. digital) information transfer has grown rapidly. Electronic mail is an application now widely used in the business community for exchanging all kinds of information, sometimes information of a confidential nature.

To preserve this confidentiality, it is vital that the information passes from the sender to the receiver without any third party being able to interpret the content of the information if the communication is intercepted. Encryption/decryption systems have therefore been developed, in particular so-called public key encryption/decryption systems.

To set up a secure communication between two users by means of a public encryption/decryption system, each user first generates a pair of keys, one being a secret key and the other being a public key. Each user retains their secret key and transmits the public key to the other user by any appropriate means. If the first user decides to transmit secure information to the second user, the first user encrypts that information using the public key of the second user, who alone is able to decrypt it using the second user's own secret key. Conversely, if the second user decides to transmit secure information to the first user, the second user encrypts the information with the public key of the first user, who alone can decrypt it using the first user's own secret key. In this way secure communications can easily be set up between a large number of users who generate their own pair of keys, but there is no means of controlling the expansion of the network of users. This problem can be solved by generating the pairs of user keys at a central location. This solution leads to another problem, however. It is necessary for a user's secret key to be communicated to the user securely, which rules out any form of electronic communication. In practice, the users' secret keys must be transmitted physically to the users, which can become a heavy administrative burden when the number of users is large.

An aim of the invention is to propose a solution to the problem of setting up secure communications between users by means of a public key encryption/decryption system enabling control over the deployment of the network of users and free of the disadvantages mentioned hereinabove.

The invention applies in particular to controlling a network of users within an organization such as an enterprise.

SUMMARY OF THE INVENTION

To this end, the invention consists in a method of establishing secure communication between users by means of a public key encryption/decryption system comprising the following steps:

a center generates a pair of keys comprising a secret key and a public key, the public key of the center is supplied to a user, the user generates a pair of keys specific to that user comprising a secret key and a public key but the public key of the user is encrypted with the public key of the center, the user transmits to the center the public key specific to that user encrypted with the public key of the center, and the center decrypts the public key of the user and if the user is approved by the center, the center retransmits to the user the public key of the user encrypted with itself.

This makes the physical transfer of the users' secret keys from the center to the users unnecessary. Moreover, the users' public keys remain under the control of the center, which can approve each user of the network on an individual basis.

In one particular embodiment of the invention, each user sends their own secret key to the center encrypted with the public key of the center so that the center is always able to decrypt the encrypted information held by approved users of the network.

The invention further consists in a public key encryption/decryption system for use by an approved user of the network. This system includes equipment for generating a pair of keys comprising a secret key and a public key, the equipment being designed so that the public key generated is automatically encrypted with another key supplied with the equipment, in particular the public key of the center. This arrangement consequently prohibits users from broadcasting the public keys when they are constructed. The equipment is advantageously designed to accept as input only public keys encrypted with the public key that it has generated, these public keys being held in memory in the equipment in this encrypted form. As a result, at the level of each user's encryption/decryption system, it is impossible to obtain directly the user's public key or the public keys of the users with which this particular user can set up a secure communication.

The invention will be better understood from a reading from the following description given with reference to the drawings.

DETAILED DESCRIPTION OF THE PREFERRED EMBODIMENTS

A public key encryption/decryption system generates a pair of keys comprising a public key and a secret key, encrypts data to be transmitted using a receiver's public key and decrypts data received using a secret key generated locally by the user of the system. A system of this kind is known in itself.

In the context of the invention, the user's encryption/decryption system includes equipment specifically designed to use a method of setting up secure communications with centralized control of network users' public keys.

Figure 1:
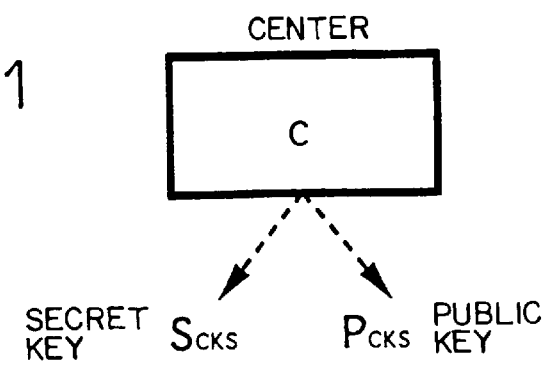
FIG. 1 is a diagram showing a first step of the method of the invention.

With particular reference to FIG. 1, at the start of construction of the network, a center C uses a conventional encryption/decryption system to generate a pair of keys comprising a secret key $S_{CKS}$ and a public key $P_{CKS}$.

The center's public key $P_{CKS}$ is supplied to a user, such as user A, with an encryption/decryption system of the invention.

Figure 2:
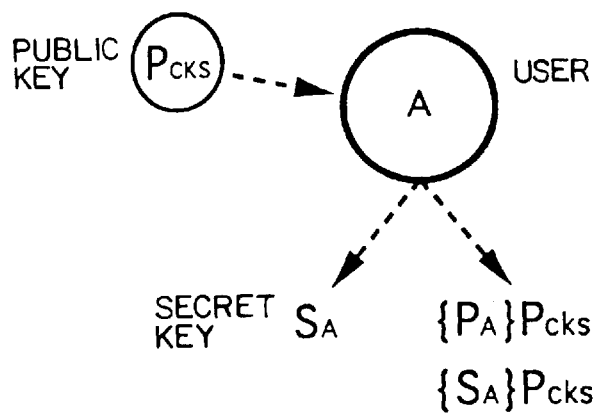
FIG. 2 is a diagram showing a second step of this method.

Referring to FIG. 2, using their encryption/decryption system the user A generates a pair of keys comprising a secret key S$_A$ and a public key P$_A$, but the equipment of the system is designed to encrypt the public key P$_A$ automatically, using the key supplied to it, i.e. the public key of the center. At this stage of the design of their keys, users do not have direct access to their public key. They know only their secret key.

Figure 3:
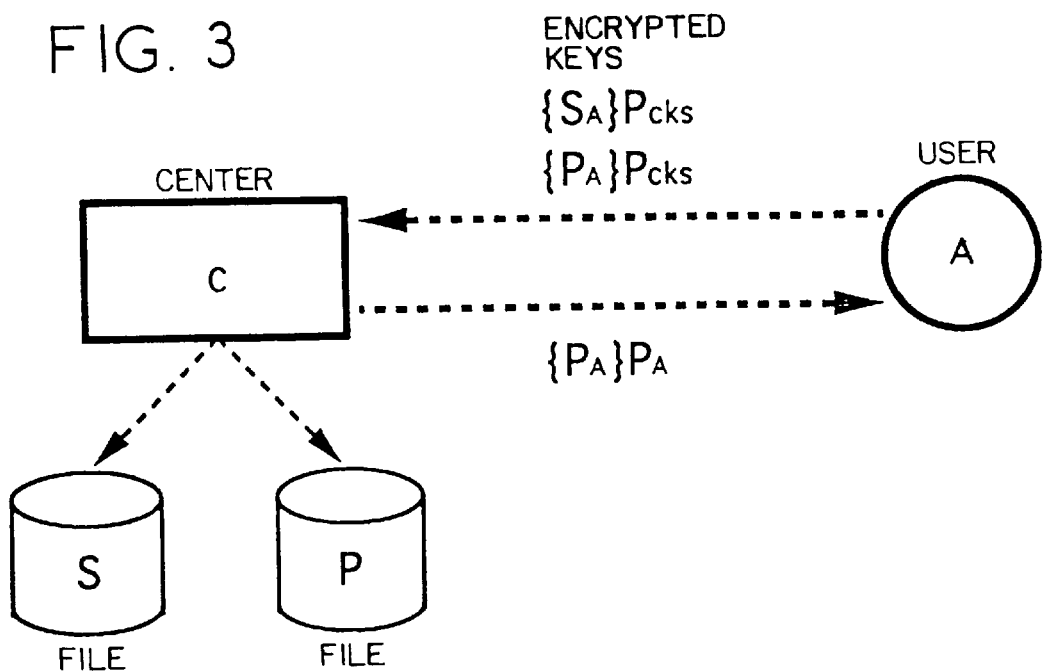
FIG. 3 shows further steps of this method.

Referring to FIG. 3, the user A transmits to the center C, via an electronic communication network, the public key P$_A$ encrypted with the center's public key P$_{CKS}$ (as indicated by {P$_A$}Pcks in FIG. 3). If appropriate, the user A transmits to the center C, over the same channel, the secret key S$_A$ encrypted with the center's public key P$_{CKS}$ (as indicated by {S$_A$}Pcks in FIG. 3).

The center C decrypts the public key P$_A$ of the user A using its secret key S$_{CKS}$ and, if appropriate, the user's secret key S$_A$. If the center C recognizes the user as an approved user, the center C holds the public key P$_A$ of that user in a first file P and, if appropriate, holds the secret key S$_A$ of that user in a second file S.

The center C then retransmits to the user A who has just been approved the public key P$_A$ of that user encrypted with itself (as indicated by {P$_A$}P$_A$ in FIG. 3).

The user's encryption/decryption system is designed to accept as input only public keys encrypted with the public key that it generated. Consequently, it accepts the public key P$_A$ of the user A encrypted with itself and holds this public key P$_A$ in memory in its encrypted form. At this stage users have no knowledge of their own public key and cannot set up secure communications with other users approved by the center.

At the center, the files S and P provide archive storage of the public keys and the secret keys of approved users. Encrypted messages transmitted subsequently by these users can always be decrypted by the center.

Figure 4:
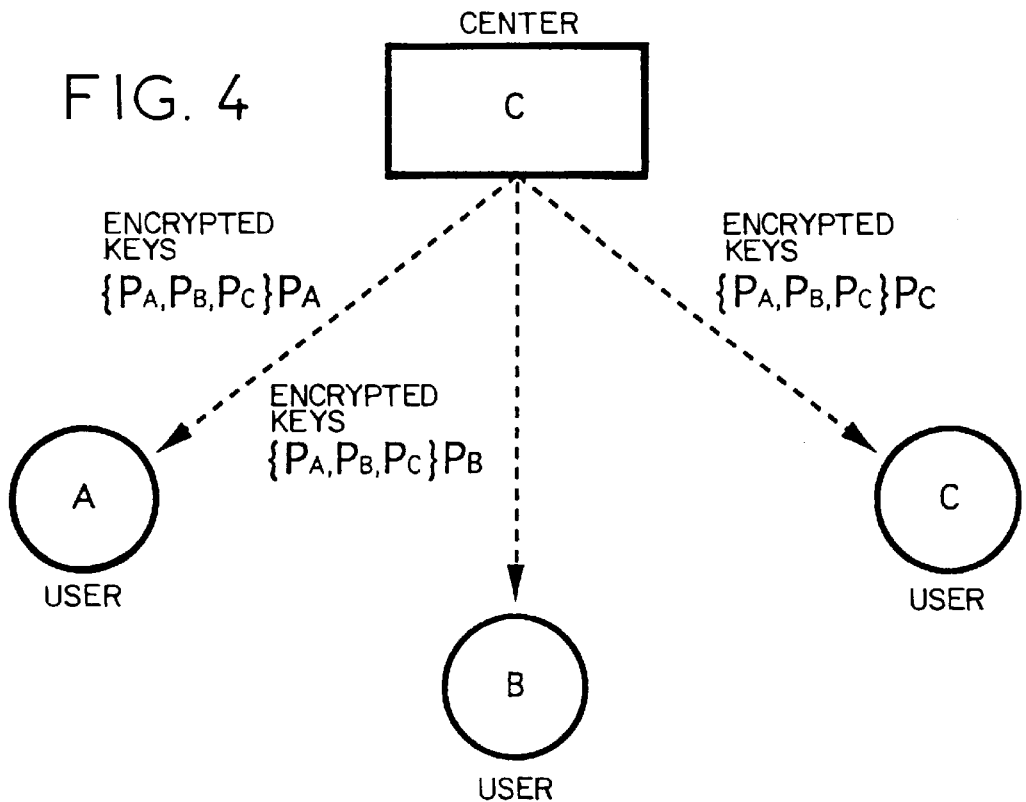
FIG. 4 illustrates a first variant of the method.

Referring to FIG. 4, to establish the possibility of secure communications between a plurality of approved users, the center C transmits to each approved user (in this example to the users A, B and C) a list of public keys encrypted with the public key of the addressee user (as indicated by {P$_A$,P$_B$, P$_C$}P$_A$ for user A, {P$_A$, P$_B$,P$_C$}P$_B$ for user B and {P$_A$, P$_B$, P$_C$}P$_C$ for user C in FIG. 4). Each public key on the list corresponds to the public key of a user approved by the center. The public keys communicated to the user are held in memory in the encryption/decryption system of that user in their encrypted form, which prevents their unrestricted circulation.

At this stage, each user to whom a list, of public keys has been sent is approved by the center and receives only the public keys of other users approved by the center. Users still have no knowledge of their own public key or of the public keys of the other users with whom they can communicate. For each encryption/decryption system of a specific user, the equipment establishes the correspondence between the public keys held in memory in the encrypted form and the identifiers of the users with whom this particular user can communicate securely.

Figure 5:
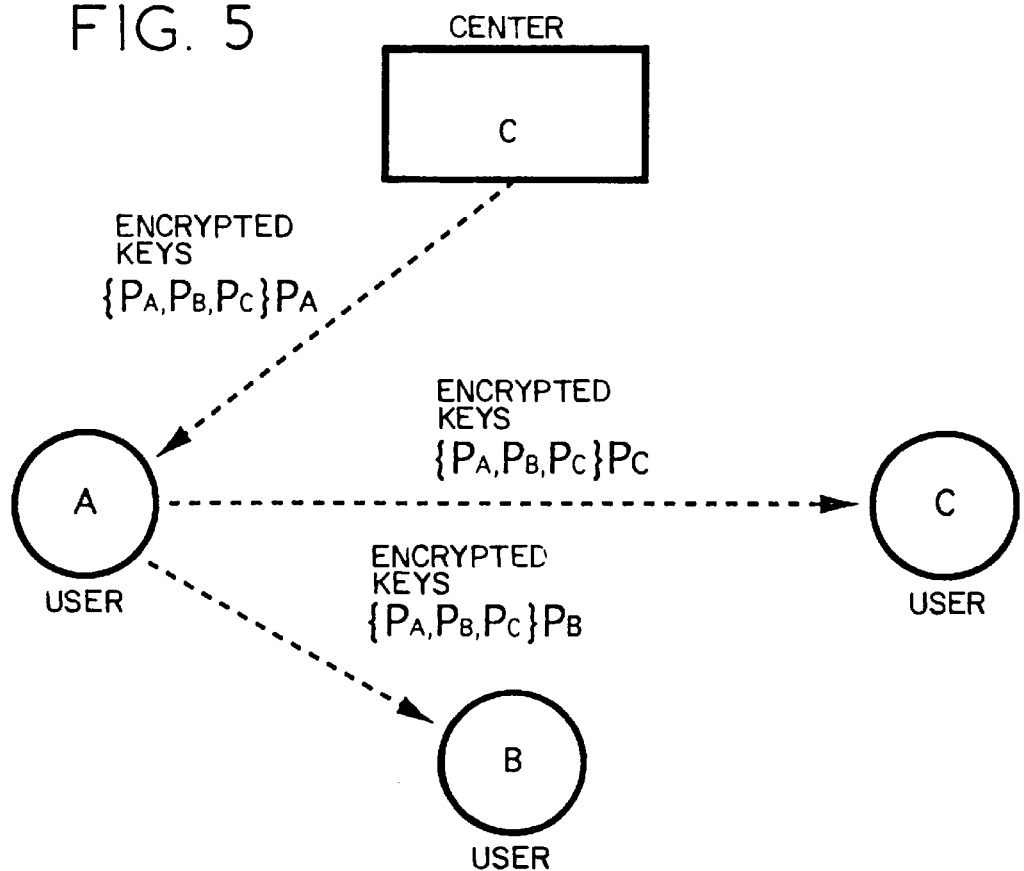
FIG. 5 illustrates a second variant of the method.

As an alternative to this, as shown in FIG. 5, the center C transmits to a particular user, in this example the user A, a list of public keys encrypted with the public key P$_A$ of that user. This particular user A then transmits this list of public keys to other users (e.g. users B and C) whose public keys are part of the list, each time encrypting the list of keys using the receiver's public key P$_B$ or P$_C$.

There is claimed:

1. A method of establishing secure communication between users by means of a public key encryption/decryption system comprising the following steps:

a center generates a pair of keys comprising a secret key and a public key, said public key of said center is supplied to a user, said user generates a pair of keys specific to said user comprising a secret key and a public key but said public key of said user is encrypted with said public key of said center, said user transmits to said center said public key specific to said user encrypted with said public key of said center, and said center decrypts said public key of said user and if said user is approved by said center, said center retransmits to said user said public key of said user encrypted with itself.

2. A method as claimed in claim 1 comprising the further step of said center transmitting to each approved user a list of public keys encrypted with said public key of the corresponding user.

3. A method as claimed in claim 1 further including the step of said center transmitting to a particular approved user a list of public keys encrypted with said public key of that particular user and said particular user transmitting to another user said list of public keys encrypted with said public key of that other user.

4. A method as claimed in claim 1 wherein said user transmits to said center the secret key specific to said user encrypted with said public key of said center.

5. A public key encryption/decryption system for implementing the method as claimed in claim 1, comprising equipment for generating a pair of keys comprising a secret key and a public key, said equipment being designed so that said public key generated is automatically encrypted with another key supplied with said equipment.

6. The system claimed in claim 5 wherein said equipment is designed to accept as input only public keys encrypted with the public key that it has generated.

7. The system claimed in claim 6 wherein said equipment is designed to hold in memory each public key encrypted with the public key that it has generated.

8. The system claimed in claim 5 wherein said other key is said public key of a center.

* * * * *

UNITED STATES PATENT AND TRADEMARK OFFICE
CERTIFICATE OF CORRECTION

PATENT NO. : 5,956,406
DATED : September 21, 1999
INVENTOR(S) : Jacques Maldy

It is certified that error appears in the above-identified patent and that said Letters Patent is hereby corrected as shown below:

Title page, Item [73] Assignee, change from "Alcatel Alstrom Compagnie Generale D'Electricite" to --Alcatel, Paris, France--.

Signed and Sealed this

Thirty-first Day of October, 2000

Attest:

Q. TODD DICKINSON

*Attesting Officer*  *Director of Patents and Trademarks*